Aug. 16, 1955   S. M. MARCUS ET AL   2,715,470
AUTOMOTIVE WRECK TOW TRUCKS
Filed June 2, 1952   2 Sheets-Sheet 1
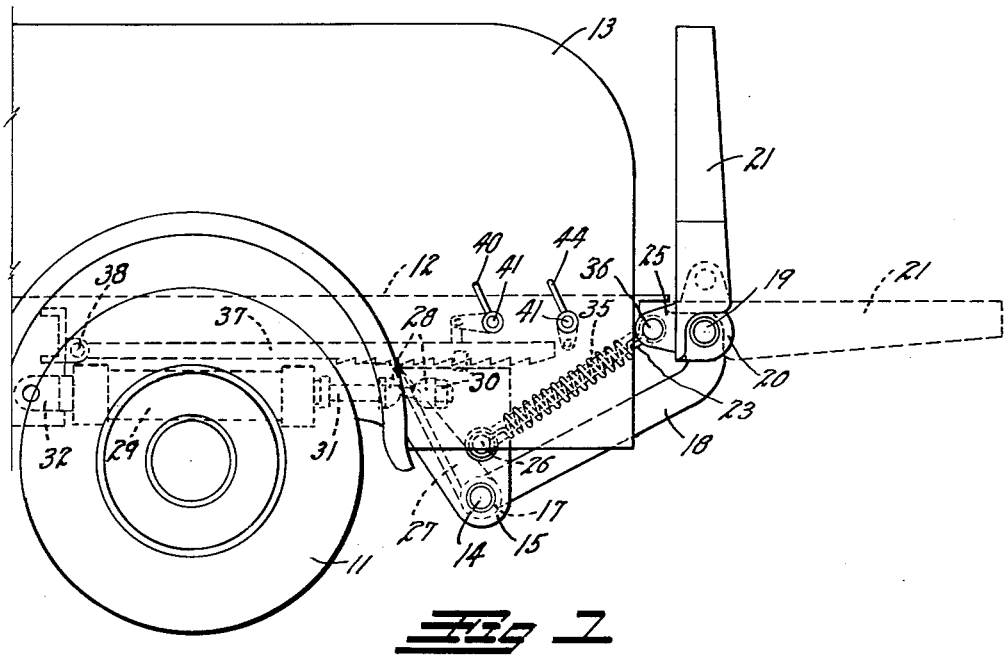
Fig. 1
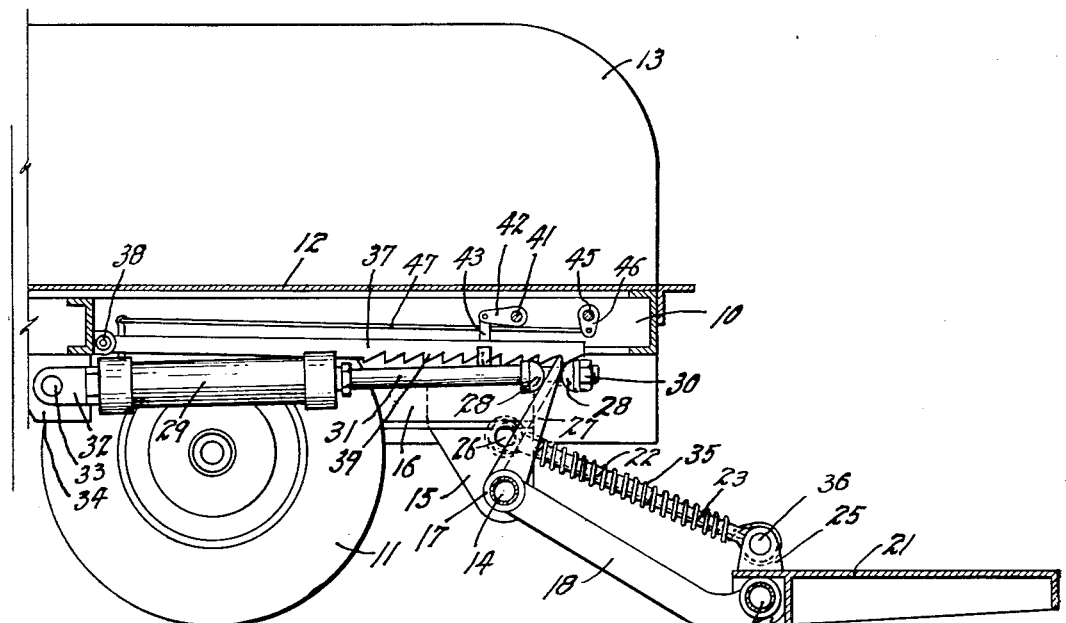
Fig. 2
INVENTORS
Samuel M. Marcus
Charles E. Rinn
Julian A. Zingheim
ATTORNEY

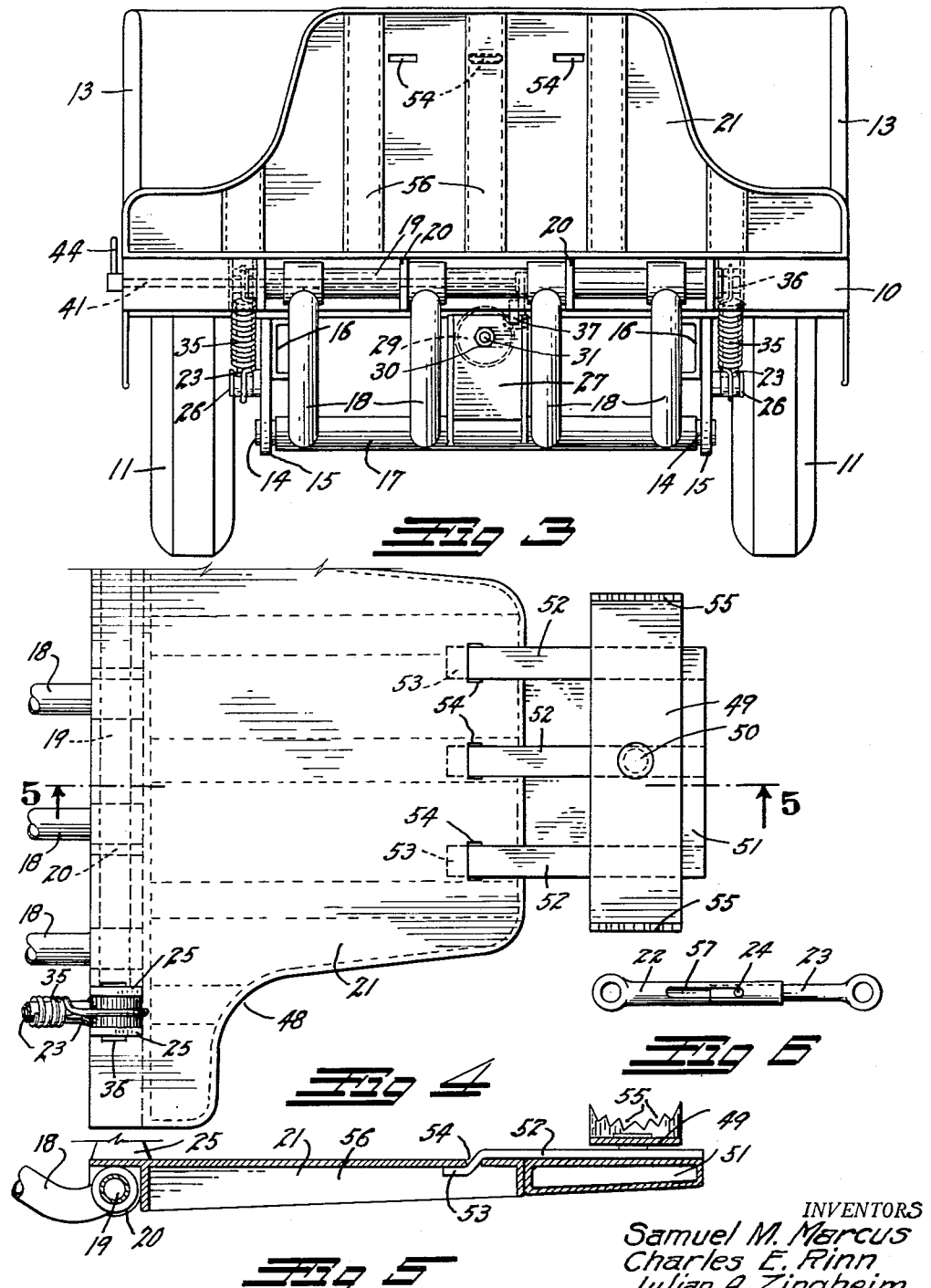

· # United States Patent Office 2,715,470
Patented Aug. 16, 1955

2,715,470
AUTOMOTIVE WRECK TOW TRUCKS

Samuel M. Marcus, Charles E. Rinn, and Julian A. Zingheim, Denver, Colo., assignors to Marcus Motors, Inc., Denver, Colo., a corporation of Colorado Application June 2, 1952, Serial No. 291,238

3 Claims. (Cl. 214—86)

This invention relates to an automotive wreck tow truck, and has for its principal object the provision of a highly efficient truck mechanism which can be operated by the truck driver without assistance to lift, tow, and carry wrecked automobiles and the like.

Another object of the invention is to so construct the truck that the usual hoisting masts, cables and reels will be eliminated, and a positive support for the wrecked car will be provided on the truck and to so construct the device that it may be locked in the elevated, towing position so as to avoid accidental damage while towing.

A further object is to provide a platform for lifting and carrying a wrecked car which will also serve as a tail gate for the truck and to provide a wreck lifting device which will not in any way interfere with the normal use and loading of the truck.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the rear extremity of the improved auto wrecker truck, showing a combination tail gate and carrying platform, as used in this invention, in the elevated position;

Fig. 2 is a longitudinal section of Fig. 1, showing the tail gate platform in the lowered position;

Fig. 3 is a rear end view of the improved truck, with the platform in the elevated position;

Fig. 4 is a fragmentary plan view of the platform in the lowered position;

Fig. 5 is a longitudinal section through the platform, taken on the line 5—5, Fig. 4; and Fig. 6 is a detail, sectional view, illustrating a telescoping tension rod employed in the improved truck.

The truck comprises a conventional chassis frame 10 supported on the usual ground-engaging wheels 11 and provided with a floor 12 and side boards 13.

In applying this invention to the truck, a tubular hinge shaft 14 is mounted below the rear extremity of the chassis frame 10 on suitable bearing brackets 15 secured to and extending downwardly from sub-frame members 16 which are welded or otherwise secured below the chassis frame 10.

A shaft sleeve 17 rotatably surrounds the shaft 14. A plurality of lifting arms 18 are welded or otherwise secured at their forward extremities to the shaft sleeve 17 so as to rotate therewith. The rear extremities of the arms 18 hingedly engage a second tubular shaft 19 which is mounted in suitable bearing ears 20 which are welded or otherwise secured along the rear edge of a platform 21.

The platform 21 is maintained in a horizontal position by means of telescoping tension links, each formed in two sections, an outer section 22 and an inner section 23. A pin 24 projects diametrically from the inner section 23 through an elongated slot 57 in the outer section 22 to limit the amount of extension of the entire link.

The rearward extremities of the tension links are mounted on hinge pins 36 carried in bracket ears 25 projecting upwardly from each side of the platform 21 adjacent the rear edge thereof and positioned directly above the second shaft 19. The forward extremities of the tension links are mounted on hinge pins 26 supported in the brackets 15 directly above the first tubular shaft 14. This arrangement causes the tension links 22—23 and the lifting arms 18 to act as parallel arms to maintain the platform 21 horizontal at all elevations.

An actuating lever 27 is welded or otherwise secured to the medial portion of the shaft sleeve 17 and extends upwardly from the latter to receive a plunger 31 which extends rearwardly from a hydraulic cylinder 29. The plunger 31 is preferably provided with rounded bearing washers 28 which are clamped against the forward and rear faces of the actuating lever 27 by means of suitable clamp nuts 30.

The hydraulic cylinder 29 is of a conventional type having a suitable, hydraulically actuated piston mounted on the plunger 31. The cylinder 29 terminates in a clevis 32 which is mounted on a clevis pin 33 supported in suitable bracket plates 34 from the chassis frame 10.

It can be seen that if hydraulic fluid be admitted to the cylinder 29 rearwardly of the piston therein, the plunger 31 will be forced forwardly to tilt the actuating lever 27 forwardly so as to rotate the sleeve 17. Rotation of the sleeve 17 swings the lifting arms 18 upwardly to lift the platform 21 vertically from the lowered position of Fig. 2 to the raised broken line position of Fig. 1. The platform 21 can then be swung to a vertical position, as shown in solid line in Fig. 1, to form a tail gate for the truck. The movement to the vertical tail gate position is manually accomplished, assisted by tension springs 35 which also act to counterbalance and assist in raising the entire platform.

One of the tension springs 35 surrounds each of the tension links 22—23. Each spring is looped at its extremities about the extremities of the tension link which it surrounds and about the hinge pins 26 and 36. When the platform 21 is swung upwardly to the tail gate position, the two sections of the two tension links 22 and 23 telescope upon each other to shorten the total length of the link to a minimum determined by the preset length of the slots 57 in the sections 22.

The platform 21 can be fixedly supported in any desired elevated position by means of a toothed ratchet bar 37 which is hingedly mounted at its forward extremity on the chassis frame 10 as shown at 38. The bottom edge of the rear extremity of the ratchet bar 37 is provided with a plurality of ratchet teeth 39 which engage the upper edge of the actuating lever 27 to prevent rearward movement of the latter at preset spaced positions.

The ratchet bar 37 can be lifted to release the teeth 39 from the lever 27 when it is desired to lower the platform 21 by means of a hand lever 40 positioned at one side of the truck. The hand lever 40 rotates a lever shaft 41, which in turn rotates a lifting lever 42. A hooked link 43 extends downwardly from the lifting lever 42 and beneath the ratchet lever. Thus, when the hand lever 40 is swung to the right in Fig. 1, the link 43 will engage and lift the ratchet bar 37 to release the actuating lever 27 and allow the platform to descend.

Fluid is admitted to either end of the hydraulic cylinder 29 through any conventional two-way hydraulic valve from a hydraulic pump (not shown) of the type used in hydraulic vehicle attachments. The flow of the fluid is controlled by means of a second manual lever 44 which is also mounted on one side of the truck upon a valve control shaft 45 which operates a valve control lever 46 connected by means of a connecting rod 47 with the conventional fluid control valve.

It is desired to call attention to the contour of the platform 21. The forward edge of the platform extends the full width of the truck body. The two sides of the platform, however, are cut inwardly, as indicated at 48, so that the rear portion of the platform is relatively narrow. In fact, it is sufficiently narrow to pass beneath the axle and between the wheels of a vehicle to be towed.

Means are provided to more effectively engage the axle of a vehicle to be towed by providing a horizontal, transversally extending, swingable, U-shaped, axle-engaging frame member 49 which is rotatably mounted on a king pin 50 extending upwardly from an extension platform 51. The upwardly turned extremities of the U-shaped frame member 49 are provided with notches 55 aligned on a concave arc. The extension platform 51 is removably supported by a plurality of cantilever arms 52 having downwardly offset forward extremities 53. The extremities 53 are designed to be inserted in receiving slots 54 formed in the platform 21, so that they will swing upwardly against the bottom of the platform to support the rearwardly extending cantilever arms 52. When not in use, the arms 52 are simply swung upwardly and forwardly to unhook their extremities 53 from the slots 54, and the extension platform 51 is stored in the truck.

When the vehicle is not in use for towing, the platform 21 is swung to the tail gate position of Fig. 1 to retain a load in the truck between the side boards 13, so that the truck can be used for ordinary haulage.

When it is desired to tow a wrecked vehicle, the platform 21 is swung rearwardly and downwardly to the broken line position of Fig. 1. The extension platform is placed in position thereon. The hydraulic cylinder is now operated to lower the platform sufficiently far so that the frame 49 may be backed beneath either the front or rear axle of the wrecked vehicle, with the wheels of the latter vehicle positioned in the inset sides 48 of the platform 21.

The hydraulic cylinder is now operated to cause the lifting arms 18 to lift the platform. This brings the notches 55 in the extremities of the frame 49 upwardly beneath the axle to lift the wheels of the wrecked vehicle from the ground.

When the wheels have been lifted sufficiently far, the entire load of the wrecked vehicle is then supported by the ratchet bar 37, and the truck, with the wrecked vehicle, is driven to the shop. The king pin 50 allows the towing vehicle to make turns without dragging the vehicle being towed sideways, and the latter vehicle freely follows the path of the towing vehicle.

The platform 21 may have any desired construction. As illustrated, it is formed from welded steel plate having a stiffening edge flange 58 and provided with hollow box-like stiffening struts 56.

The extension platform 51 is of hollow box construction for strength and lightness. The forward face of the box lies against the rear face or edge of the platform 21 so as to provide a rigid support to prevent the extension platform from being bent downwardly.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. An elevatable tail gate for vehicles comprising: a bearing bracket extending downward from said vehicle at each side and adjacent the rear extremity of said vehicle; a rotatable sleeve extending between said brackets; a plurality of lifting arms affixed to and extending rearwardly from said sleeve in alignment with each other; a hinge shaft supported by the rear extremities of said arms; a platform hingedly mounted at its forward extremity upon said hinge shaft; an operating lever affixed to and projecting upwardly from the medial portion of said rotatable sleeve; hydraulic means connected to said operating lever and extending forwardly to a hinged connection with said vehicle for rotating said sleeve; a bracket ear fixedly secured to said platform at each side thereof; a hinge pin mounted in each bracket ear adjacent said hinge shaft, said hinge pins being positioned relative to said hinge shaft so that said pins will be above said hinge shaft when said platform is horizontal, and forwardly of said hinge shaft when said platform is vertical; a telescoping link extending from each hinge pin to one of said bearing brackets in parallel relation to and above said lifting arms; stop means limiting the extension of said telescoping links to a position which will maintain said platform horizontal; tension spring means secured between the extremities of each telescoping link and tending to contract said telescoping links so as to pull said hinge pins forwardly to a position which will support said platform in a substantially vertical position to form a tail gate for said vehicle; a longitudinally immovable, and substantially horizontal, toothed ratchet bar hinged to said vehicle adjacent and above the hinge point of said hydraulic means and extending rearwardly in parallel relation with the latter, with its toothed portion directed downwardly to engage said operating lever to stop rearward movement of the latter at any desired point; and manually operated means for lifting said ratchet bar out of engagement with said operating lever when desired.

2. An elevatable tail gate for vehicles as described in claim 1 in which the forward portion of said platform is sufficiently wide to extend laterally beyond the wheels of said vehicle, and in which the rear portion of said platform is sufficiently narrow to pass between the wheels of a conventional road vehicle and having a king pin supported at the middle of said narrowed portion; and an axle-engaging member pivotally mounted on said king pin and extending oppositely outward at opposite sides of the latter, thence upwardly to engage the axle of a vehicle to be towed.

3. An elevatable tail gate for a vehicle body comprising: a hinge shaft positioned across the rear of said body; means for hydraulically raising and lowering said hinge shaft; a platform hingedly mounted at its forward edge on said hinge shaft so that it may be swung upwardly to a tail gate position and downwardly to a platform position, the forward portion of said platform being sufficiently wide to extend laterally beyond the wheels of said vehicle, and in which the rear portion of said platform is sufficiently narrow to pass between the wheels of a conventional road vehicle; a king pin supported at the middle of said narrowed portion; and an axle-engaging member pivotally mounted on said king pin and extending oppositely outward at opposite sides of the latter, thence upwardly to engage the axle of a vehicle to be towed.

References Cited in the file of this patent

UNITED STATES PATENTS

| | | |
|---|---|---|
| 1,878,995 | Abbe | Sept. 27, 1932 |
| 1,929,112 | Hansen | Oct. 3, 1933 |
| 2,099,998 | Berg | Nov. 23, 1937 |
| 2,183,478 | Holmes et al. | Dec. 12, 1939 |
| 2,350,641 | Ruddock | June 6, 1944 |
| 2,390,268 | Penney | Dec. 4, 1945 |
| 2,391,813 | Wood | Dec. 25, 1945 |
| 2,436,000 | Fleming | Feb. 17, 1948 |
| 2,449,146 | Ryan | Sept. 14, 1948 |
| 2,564,111 | Kimball | Aug. 14, 1951 |
| 2,576,881 | Kern | Nov. 27, 1951 |
| 2,611,579 | Guzey, Jr., et al. | Sept. 23, 1952 |
| 2,654,491 | Duis et al. | Oct. 6, 1953 |
| 2,683,539 | Corley, Jr. | July 13, 1954 |
| 2,696,923 | Messick | Dec. 14, 1954 |